United States Patent [19]

Savit

[11] Patent Number: 4,910,715

[45] Date of Patent: Mar. 20, 1990

[54] MARINE SEISMIC STREAMER CABLE

[76] Inventor: Carl H. Savit, 201 Vanderpool, #49, Houston, Tex. 77024

[21] Appl. No.: 323,160

[22] Filed: Mar. 15, 1989

Related U.S. Application Data

[63] Continuation-in-part of Ser. No. 143,923, Jan. 14, 1988, abandoned.

[51] Int. Cl.⁴ .............................................. G01V 1/38
[52] U.S. Cl. ...................................... 367/20; 367/154; 181/110; 174/101.5
[58] Field of Search ............... 367/20, 154; 174/101.5; 181/110, 112

[56] References Cited

U.S. PATENT DOCUMENTS

| H 387 | 12/1987 | Kruka et al. | 367/154 |
|---|---|---|---|
| 1,584,613 | 5/1926 | Comstock et al. | 367/154 |
| 3,480,907 | 11/1969 | King | 367/154 |
| 3,921,755 | 11/1975 | Thigpen | 367/177 |
| 4,072,123 | 2/1978 | Byers | 114/254 |
| 4,314,363 | 2/1982 | Thigpen et al. | 367/16 |
| 4,496,796 | 1/1985 | Matikainen et al. | 174/101.5 |
| 4,547,869 | 10/1985 | Savit | 367/149 |

OTHER PUBLICATIONS

Evaluation of a Solid Hydrophone Cable; J. Berni et al., Offshore Technology Conference, 1980, Paper 3807.

Primary Examiner—Ian J. Lobo
Attorney, Agent, or Firm—William A. Knox

[57] ABSTRACT

A plurality of sensor arrays are mounted in a streamer cable. The sensors within each array are distributed over an elongated two-dimensional vertical plane. The seismic streamer cable is so constructed that its vertical dimension is substantially greater than its width and the top portion is relatively more buoyant in the water than the bottom portion. Because of that configuration the streamer cable resists vertical strumming and, when the sensor arrays are used in the differential mode, there is no orientation uncertainty.

10 Claims, 1 Drawing Sheet

MARINE SEISMIC STREAMER CABLE

RELATION TO OTHER APPLICATIONS

This is a continuation of U.S. patent application Ser. No. 07/143,923, filed 01/14/88, and now abandoned.

BACKGROUND OF THE INVENTION

1. Field of the Invention

This invention relates to marine seismic streamer cables such as might be found in class 367/15.

2. Discussion of the Prior Art

Conventional marine seismic streamer cables usually consist of a hose-like tubular plastic jacket of circular cross-section, about 6.5 cm in diameter, that contains a plurality of hydrophones mounted therein at intervals of perhaps, one meter. The hydrophones are electrically interconnected into arrays of one or several hydrophones per array. The streamer cable is usually divided into sections on the order of 100 meters long. Each section may include 10 or more hydrophone arrays. A number of individual sections, perhaps as many as 50, are interconnected to form the complete streamer cable.

Seismic signals from the respective hydrophone arrays are transmitted to a multi-channel signal utilization device aboard the ship that tows the streamer cable through a body of water. The seismic signals from each array may be transmitted as analog signals through individual electrical conductors or they may be transmitted as digital signals through a telemetric system. Regardless of the type of signal transmission, the combined weight of the electrical conductors, hydrophones, stress members and ancillary equipment, is considerable. Therefore, the tubular jacket is filled with a liquid aliphatic hydrocarbon, also known as cable oil, to provide neutral buoyancy for the cable when under tow in the water.

There are problems with seismic streamer cables of conventional type. Because of the liquid content, tube waves are generated that propagate through the cable oil to create undesired noise. Because the streamer cable is under tow in the water, the cable is necessarily under substantial tension and tends to strum like a violin string. The vertical component of such vibration produces troublesome noise, particularly when the hydrophones are employed in pairs in a differential mode as taught by U.S. Pat. No. 4,547,899, which is incorporated herein by reference. An insidious type of noise is caused by so-called bulge-waves. Bulge-waves are due to alternate bulging and contraction of the plastic jacket caused by certain types of externally-applied accelerations and jerk.

There are certain mechanical problems inherent in the hose-like, cylindrical design of conventional streamer cables. Such cables twist and turn about their longitudinal axis when under tow. As taught by the '869 patent, in order to properly resolve the AC and DC components of arriving seismic waves, three or four sensors per unit array were required in order to determine which sensor was "up". Furthermore, to achieve a desired resolution, in the differential mode, the sensors need to be well separated. In a cylindrical cable, the volume of the cable increases as the square of the separation. But physical constraints on the size and capacity of the cable storage reels on the towing ship, severely limit the permissible volume of the streamer cable as a whole, and hence the sensor separation.

Seismic cables for marine use, having a cylindrical configuration, are known, wherein foam or solid floatation material is used for buoyancy. Such cables are confined to bottom-drag or yo-yo operations such as by U.S. Pat. No. 4,314,363. That type of cable is not a true streamer cable and is used only in shallow water.

A flat belt-like cable is disclosed in U.S. Pat. No. 3,921,755. The belt cable is relatively heavy and is confined to use exclusively as a bottom-drag cable. It has no buoyancy means and is designed to lie flat on the sea floor.

SUMMARY OF THE INVENTION

It is a purpose of this invention to provide an instrumented marine streamer cable of substantially neutral buoyancy that will provide a substantial separation, in a vertical plane, of seismic signal sensors, such as hydrophones, but with reduced overall volume. It is another purpose of this invention to provide a seismic streamer cable that inherently resists vertical strumming and eliminates the possibility of generation of tube and bulge waves. It is yet another purpose of this invention to provide a streamer cable that is resistant to twisting when under tow. It is a further object of this invention to provide a streamer cable having a substantially flat configuration that is easily reeled on a cable storage reel without wasted space. The cable allows maximum vertical separation of sensors with minimum volume increase.

In accordance with an aspect of the invention, a plurality of arrays of seismic signal sensors are provided such that the individual sensors in each array are disposed over an elongated, substantially two-dimensional plane. An elongated flexible jacket that has a longitudinal axis and that includes top and bottom portions, encases the sensor arrays along with seismic-signal transmission lines. One dimension of the jacket, measured perpendicular to the longitudinal axis is substantially greater than the other dimension as measured perpendicular to the longitudinal axis. At least one elongated stress member is embedded in the flexible jacket. Non-volatile, non-liquid floatation means are embedded in the top portion of the flexible jacket and are substantially uniformly distributed along its length.

In another aspect of this invention, means are provided to constrain the top and bottom portions of the seismic streamer cable to remain substantially in a vertical plane along its length when under tow.

BRIEF DESCRIPTION OF THE DRAWINGS

The benefits and advantages of my invention will be better appreciated by reference to the appended detailed description and the drawings wherein.

DETAILED DESCRIPTION OF THE PREFERRED EMBODIMENT

Figure 1:
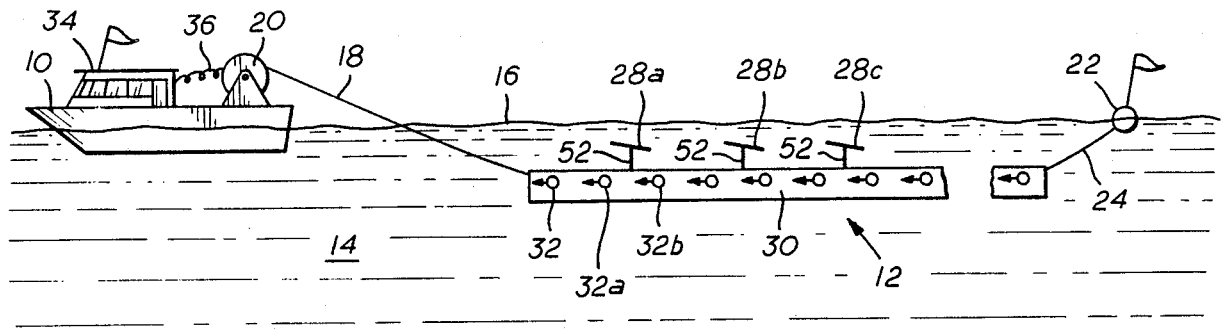
FIG. 1 illustrates a seismic ship towing the marine seismic streamer cable of this invention through a body of water.

FIG. 1 shows a seismic exploration ship 10 towing an elongated instrumented marine streamer cable 12 through a body of water 14 beneath the surface 16 thereof. The cable 12 is secured to ship 10 by means of a heavy lead-in cable 18 from a cable storage reel 20. The trailing end of cable 12 is marked by tail buoy 22 which is attached to cable 12 by a rope 24. The weight and length of the lead-in cable holds the head end of the streamer cable at a desired depth such as 15 meters. A plurality of cable depth controllers 28a, 28b, 28c maintain the longitudinal axis of the cable at the required depth along the length of the cable. The depth controllers are conventional; they may be had from Syntron Inc. of Houston, Tex.

The cable consists of a flexible jacket 30 of a suitable plastic, such as polyvinyl chloride, that has sandwiched therewithin, a plurality of geophysical instruments such as seismic sensor arrays, by way of example but not by way of limitation, shown schematically as small circles 32, 32a, etc. with a short leftward-extending arrowhead. The short arrowheads schematically represent the signal transmission lines for interconnecting the respective sensor arrays with a signal utilization device (not shown) in cabin 34 of ship 10 via lead-in cable 18, cable storage reel 20, and deck cable 36. The individual lines are not shown to avoid undue complexity of the drawing. Although the transmission means may be a metallic electrical conductor or a telemetric link, I prefer to use optical fibers as taught by my '869 patent.

Figure 2:
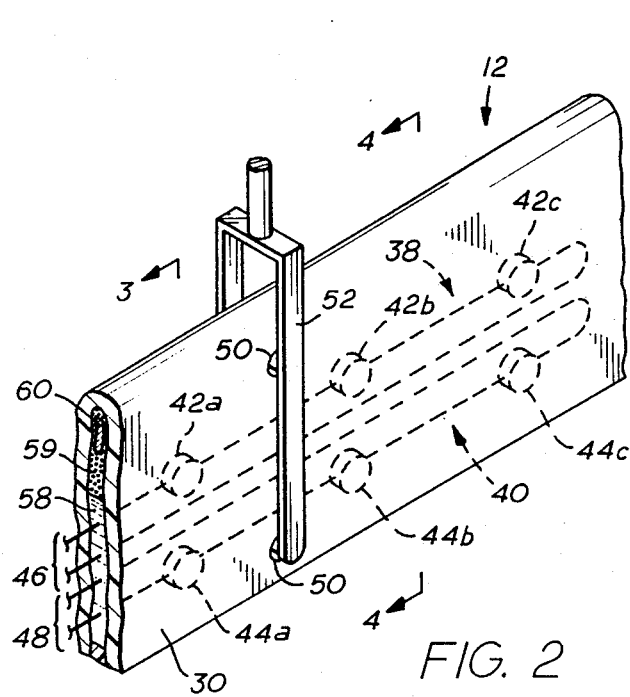
FIG. 2 is an enlarged isometric view of a portion of the cable of FIG. 1.

FIG. 2 is an isometric view of a portion of cable 12 which may be of a generally planar construction. A seismic-signal-sensor array such as 32 may consist of one or several individual seismic sensors. In FIG. 2, there are shown an upper sub-array 38 and a lower sub-array 40, each including three sensors 42a, 42b, 42c, and 44a, 44b, 44c respectively. As may be seen from FIG. 2, the sub-arrays are disposed over an elongated, vertical, substantially two-dimensional plane parallel to the longitudinal axis of the streamer cable. The two sub-arrays taken together may form a single sensor array configured in the differential mode.

There is a significant difference between the arrays of this invention and the teachings of the '869 patent. In the patent, three or four sensors were secured around the inside of the tubular jacket in a vertical plane perpendicular to the longitudinal axis of the jacket. The output of each sensor was sent individually to a data processor so that the orientation in the vertical plane of the sensor coils could be resolved. In this disclosure, because the streamer cable is constrained to remain vertical, the orientation of the sensor arrays is known. Therefore, the same number of sensors that were previously used individually merely to orient a given sensor set, can now be combined in tandem thereby to increase the array sensitivity by several dB.

Returning now to FIG. 2, for illustrative purposes, flexible jacket 30 is shown as transparent so that the disposition of sensor arrays 38 and 40 can be clearly seen. The sensor output signals are fed through their signal transmission lines 46 and 48 back to ship 10 as earlier described. At intervals along cable 12, means such as grommets or bushings 50 and 50' and a supporting member 52, may be used for attachment to a depth controller such as 28a to cable 12, thereby to provide means for constraining cable 12 to remain in a substantially horizontal plane along its length.

Figures 3, 4:
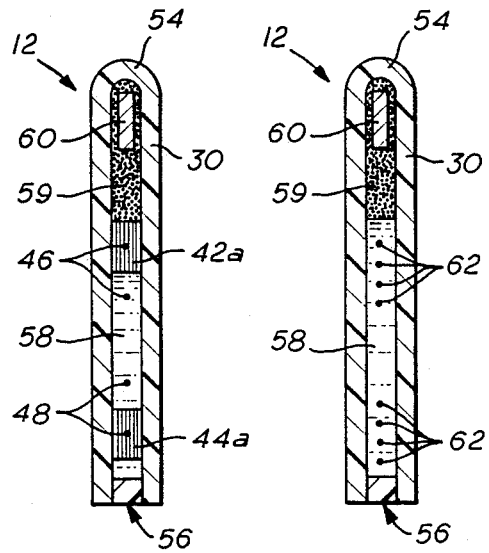
FIG. 3 is a cross-sectional view of FIG. 2 along line 3-3'.
FIG. 4 is a cross-sectional view of FIG. 2 along line 4-4'.

Refer now to FIG. 3, a section along line 3-3' of FIG. 2. Essentially, flexible jacket 30 is manufactured from an elongated, flat sheet of suitable plastic material, along the length of which, is defined a center line. A stress member 60, is laid close to and parallel with the center line along one side of the plastic sheet. Sensors, such as 42a and 44a are positioned at desired intervals along the same side of the sheet and are secured thereto by a potting material 58 such as a flexible polysulfide rubber compound to acoustically couple the sensors to the water through the acoustically-transparent plastic sheet. In the region between the sensors, such as 42a and 44a, and the center line, and embedding the stress member, a non-volatile flotation means, such as microballoons or microspheres 59, made by Pierce-Stephen Company, of Buffalo, N.Y., is distributed uniformly along the length of the plastic sheet on the one side thereof. Alternatively, entrained air bubbles or an air-containing tube could be molded into the plastic sheet generally along the centerline region of the sheet. After the stress member, sensors, potting compound and flotation material have been emplaced along the one side of the plastic sheet, the other side is folded over at the center line to sandwich the stress member, sensors, etc., between the two sides. The bottom edges 56 are suitably sealed to create a waterproof jacket for the contents of the streamer cable. The stress member 60 and the flotation material 59, thus occupy the upper portion 54 of jacket 30. In FIG. 3, signal transmission lines 46 add 48 are shown, but no others, to avoid confusing the drawing. For convenience, streamer cable 12 is divided into sections (not shown in FIG. 1), each abut 100 meters long.

Elongated stress member 60 is preferably woven from aramid fiber. More than one stress member may be used if desired. With the stress member near the top portion 54 of the flexible jacket, along with the embedded flotation means 59 also located near the top, the cable will be inherently stable, tending to hang vertically as desired because of the increased buoyancy of the top portion 54 of jacket 30 relative to the bottom portion 56.

FIG. 4 is a cross-section of FIG. 2 along line 4-4'. FIG. 4 is similar to FIG. 3 except that an exemplary plurality 62 of seismic signal transmission lines from other arrays in the cable is shown. Again, any void between the opposite sides of flexible member 30 may be filled with a potting compound 58.

Figure 5:
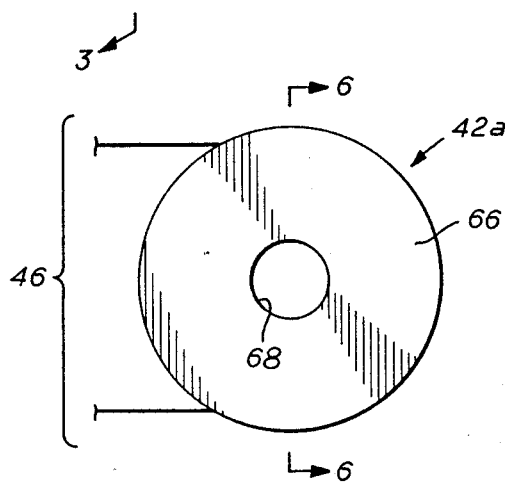
FIG. 5 is a side view of an optical-fiber sensor.
Figure 6:
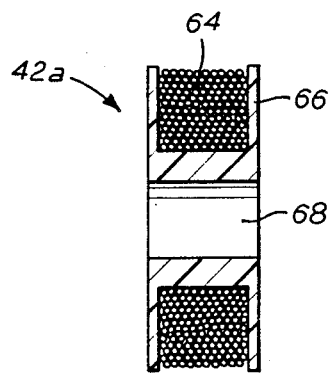
FIG. 6 is a cross-sectional view of FIG. 5 along line 6-6'.

Although any type hydrophone may be used, I prefer to use optical fiber sensors as described in my '869 patent. Referring to FIGS. 5 and 6, preferably a sensor such as 42a consists of a coil 64 of many turns of an optical fiber wound around a bobbin 66 that may, if desired, be supported by an inner mandrel 68. That type of sensor is quite compact and is lightweight; a coil measuring less than 1 cm thick and 2-3 cm in diameter is adequate.

Customarily, streamer cables are provided with a resilient section or sections between the lead-in 18 and the streamer cable 12 not shown in FIG. 1). Such a section is termed a "stretch section" in geophysical parlance and serves to isolate the streamer cable from the acceleration or jerk produced by the motions of the towing ship. If such a resilient section is desired it may be provided by a conventional tubular stretch section or by a section according to this invention in which stress member 60 would be composed of a flat, braided, nylon ribbon whose elongation under stress is at least as great as that of a plastic jacket 30.

With regard to optical-fiber transmission lines in such a stretch section, it is to be understood that, because flexible member 30 will tend to stretch when under tow, 30% to 50% slack in the lengths of the fibers may be provided by configuring the fibers 62 in a sinusoidal pattern.

From the previous description and the drawings, it is clear that one dimension of the jacket, as measured perpendicular to the longitudinal axis, i.e. the vertical height, is substantially greater than the other dimension as measured transversely to the longitudinal axis, i.e. the horizontal width. Because the cable is inherently stiff in the vertical plane, it resists vertical streamming. Since the flexible jacket is less buoyant in the water at the bottom portion than at the top portion, it tends to hang vertically in the water when under tow, particularly with the assistance of the depth controllers. It therefore resists twisting. Because of the flat construction, the volume of the streamer cable increases linearly with the separation of the sensor sub-arrays, when used in the differential mode, rather than as the square of the separation as with tubular construction.

Processing of the signals from the optical fiber sensors can be done by suitable modification of the data processor taught by my '869 patent. However, the processing is considerably simplified because the sensor-orientation uncertainty does not exist using my present teachings.

I have described my preferred embodiment and disclosed the best mode of construction. However, those skilled in the art will recognize that other physical arrangements may be used and that other manufacturing techniques may be used. Seismic sensor arrays have been illustrated, but gravity sensors or temperature sensors might be employed for selected geophysical measurements in conjunction with the instrumented streamer cable of this invention. All of such variations would fall within the scope an spirit of this disclosure which is limited only by the appended claims.

I claim as my invention:

1. A marine seismic streamer cable comprising:
    a plurality of arrays of seismic-signal sensors, the seismic-signal sensors within each said array being disposed over an elongated, substantially two-dimensional, vertical plane;
    signal transmission means for interconnecting the corresponding arrays with a signal utilization device;
    an elongated flexible jacket means, having a longitudinal axis, a top portion and a bottom portion, for enclosing said arrays of seismic-signal sensors and said signal transmission means, one dimension of said jacket means as measured perpendicular to said longitudinal axis being significantly greater than the other dimension as measured transversely to said longitudinal axis;
    elongated stress-member means embedded in said jacket; and
    non-volatile floatation means embedded near the top portion of said jacket and distributed substantially uniformly along its length.

2. The marine seismic streamer cable as defined by claim 1 wherein:
    each array of seismic signal sensors includes a plurality of sub-arrays disposed in a differential configuration.

3. The marine seismic streamer cable as defined by claim 2, comprising:
    means for constraining the top and bottom portions of said flexible jacket means to maintain themselves in vertical alignment along the length of the streamer cable when under tow in a body of water.

4. The marine seismic streamer cable as defined by claim 1 wherein said seismic-signal sensors include multiturn optical fiber coils.

5. The marine seismic streamer cable as defined by claim 3, wherein:
    said non-volatile floatation means includes microspheres embedded in said flexible jacket means.

6. The marine seismic streamer cable as defined by claim 3, wherein:
    the top portion of said flexible jacket means includes entrained air bubbles.

7. A marine streamer cable, comprising:
    an elongated, flexible jacket means that is characterized by a longitudinal axis, and top and bottom portions, the vertical height of said jacket means being significantly greater than the horizontal width;
    floatation material distributed uniformly along the top portion of said jacket to render said marine streamer cable substantially neutrally buoyant;
    a plurality of arrays of seismic-signal sensors enclosed by said jacket, the seismic-signal sensors within each array being disposed over an elongated, two-dimensional, vertical plane parallel to said longitudinal axis.

8. The marine streamer cable as defined by claim 7, comprising:
    means for constraining the top and bottom portions of said flexible jacket means to remain in vertical alignment along the length of the streamer cable when said streamer cable is under tow in a body of water.

9. The marine streamer cable as defined by claim 8, wherein:
    each array of seismic-signal sensors includes a plurality of sub-arrays, said sub-arrays being arranged in a vertically-disposed, differential configuration parallel to said longitudinal axis.

10. An instrumented streamer cable comprising:
    a first plurality of sensors,
    a second plurality of sensors,
    means within the cable for maintaining said first plurality of sensors above said second plurality of sensors,
    wherein the vertical height of said cable is significantly greater than the horizontal width.

* * * * *